Figure 8:
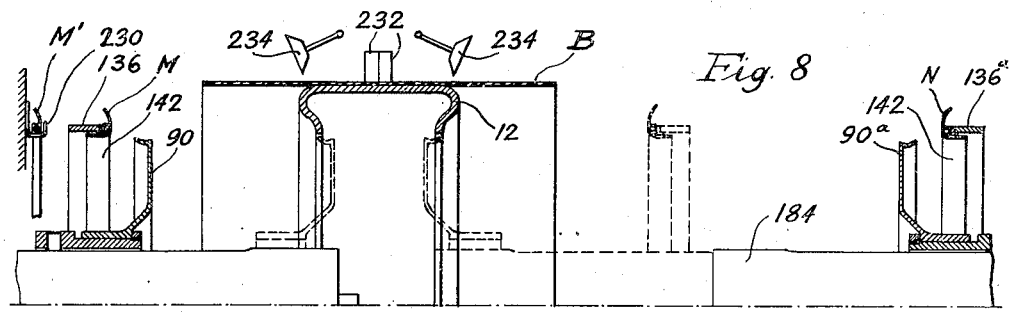

Nov. 22, 1949 J. I. HAASE 2,488,863
APPARATUS FOR BUILDING TIRES
Filed Aug. 26, 1942 4 Sheets-Sheet 1
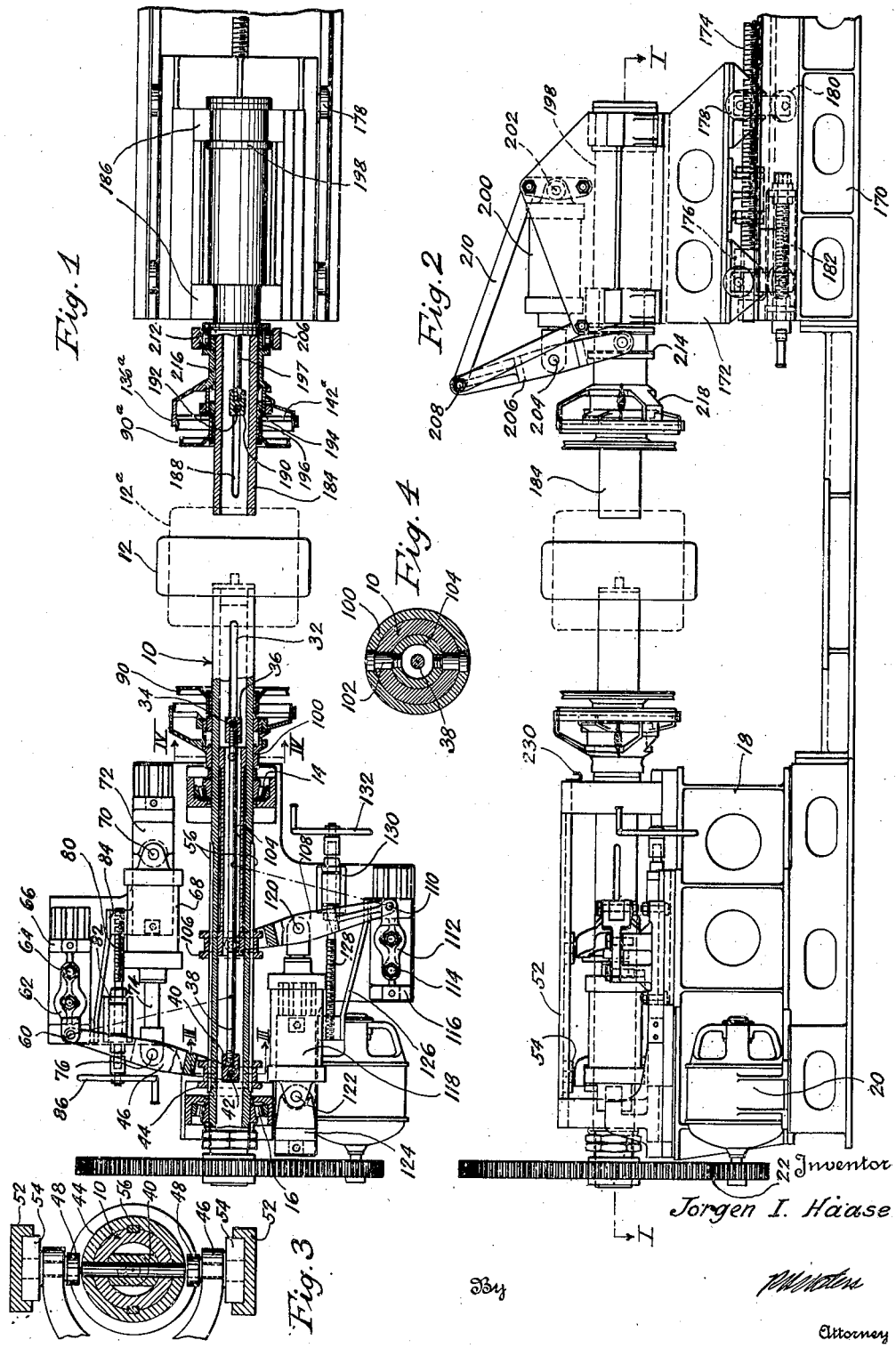
Inventor
Jorgen I. Haase

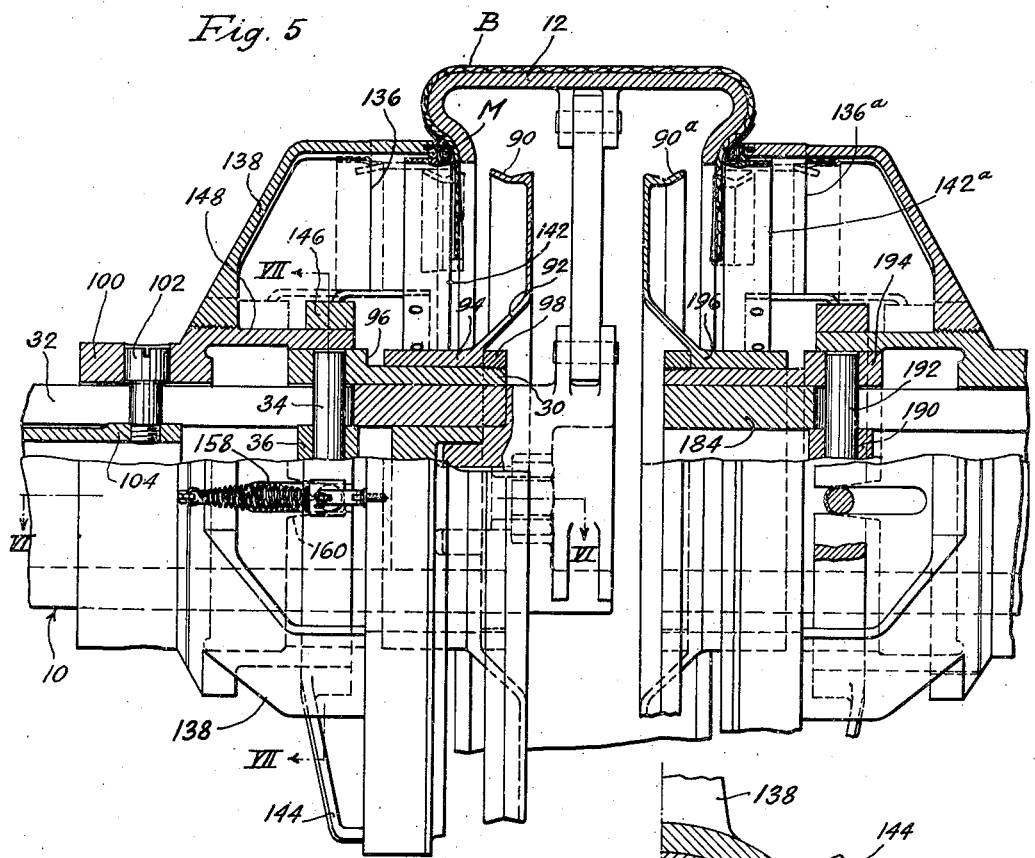
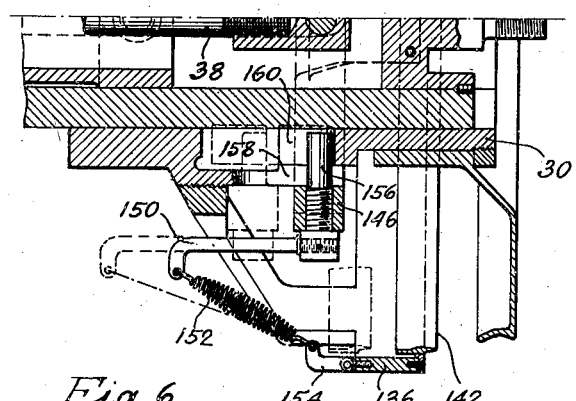
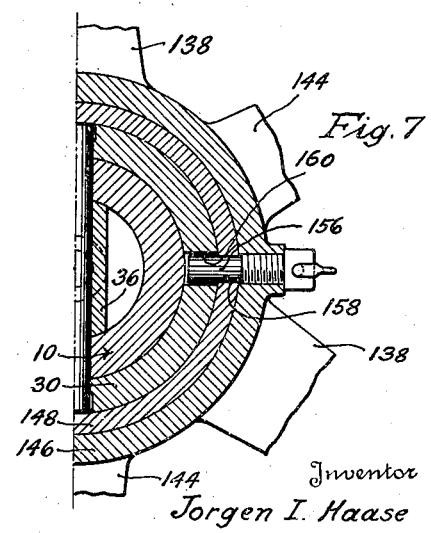

Inventor
Jorgen I. Haase

By

Attorney

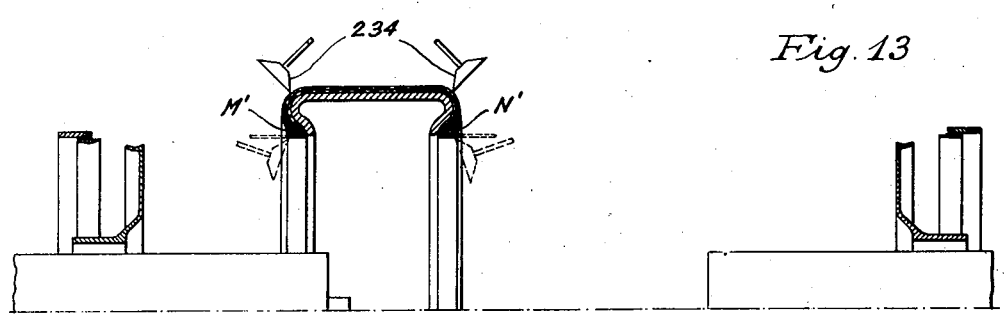
Fig. 13
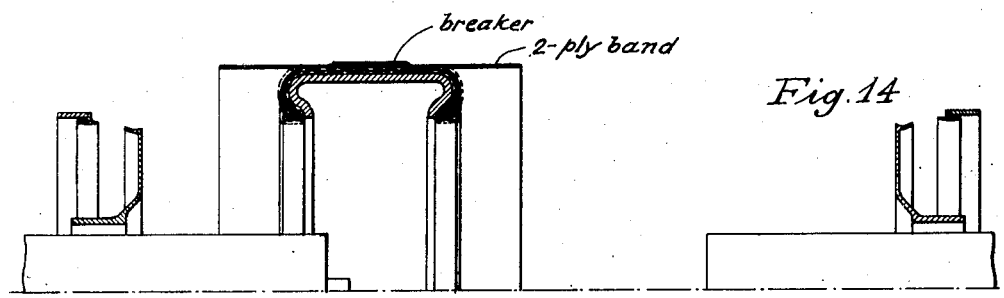
Fig. 14
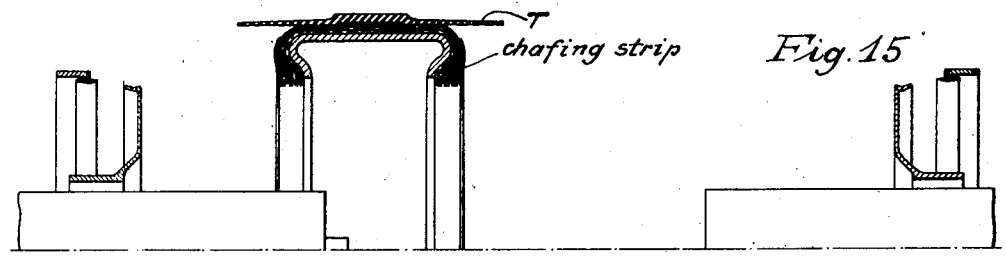
Fig. 15
Fig. 16
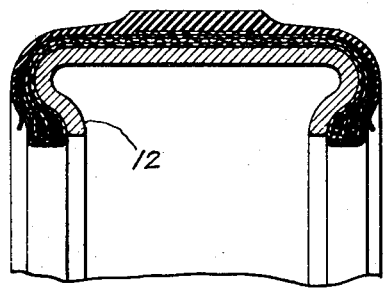
Inventor
Jorgen I. Haase Patented Nov. 22, 1949

2,488,863

UNITED STATES PATENT OFFICE 2,488,863

APPARATUS FOR BUILDING TIRES

Jorgen I. Haase, Akron, Ohio, assignor to Wingfoot Corporation, Akron, Ohio, a corporation of Delaware Application August 26, 1942, Serial No. 456,185

9 Claims. (Cl. 154—9)

This invention relates to methods and apparatus for building pneumatic tires, and, more particularly, is concerned with methods and apparatus for facilitating the construction of relatively large and heavy pneumatic tires built up from a plurality of bands of multi-ply rubberized cord fabric.

It has been substantially standard practice for a considerable length of time to build up relatively large and heavy pneumatic tires, such as used on trucks, buses, earth moving equipment, heavy airplanes, and the like, from a very considerable plurality of plies of rubberized cord fabric, usually more than ten, and often by building the plies into a plurality of bands on apparatus separate from the tire building drum. Usually, each band is made from a plurality of plies of rubberized fabric, for example four, with the plies being laid at alternate cord angles, all in known fashion. However, very considerable difficulty has always been experienced in handling the built-up bands and assembling them in a tire carcass during the building operation, particularly insofar as folding the edges of the band about the tire beads is concerned. The well known practice of building these large heavy and many ply tires on a building form or drum having a flattened outer periphery but bead areas designed to position the beads during the building operation substantially in the manner that the beads are positioned in the vulcanized tire has further complicated the folding of the edges of the band around the beads.

It is the general object of my invention to avoid and overcome the foregoing and other difficulties of and objections to known building methods and apparatus for pneumatic tires by the provision of improved, relatively inexpensive, easily-operated and practiced methods and apparatus for facilitating the construction of pneumatic tires, and, particularly, the construction of heavy pneumatic tires having a large number of plies.

Another object of my invention is to provide methods and apparatus for expediting and simplifying the folding of the edges of a multi-ply band of rubberized cord fabric about the inextensible bead portions of a tire.

Another object of my invention is the provision of apparatus for building tires incorporating means for laterally holding tire beads against the bead areas of tire fabric on a building form, means for radially centering the beads, and means for axially moving the radially inwardly extending edges of the fabric around the bottom portion of the bead while progressively removing the bead centering means.

Another object of my invention is the provision of a method of stitching the side edges of a band or ply of rubberized fabric about the base of a bead in a pneumatic tire building operation, and with the stitching force being applied in a direction substantially opposite to a force laterally holding the bead against the tire carcass.

Another object of my invention is the provision of tire building methods and apparatus for "snubbing" the beads over their entire surface simultaneously, i. e. for pulling the radially inwardly extending ply fabric edges around the beads simultaneously until they become attached to the base of the beads and extend axially outward.

The foregoing objects of my invention, and other objects which will become apparent as the description proceeds, are achieved by the provision of apparatus for building pneumatic tires and comprising a rotary building drum, means for holding a bead against the side of the drum, means for centering the beads, fabric working means adapted to engage with the radially inwardly directed edges of the fabric, means for moving the fabric working means axially outwardly of the drum to bend the inwardly extending fabric edges around the base of the beads, means associated with the fabric working means for picking up the centering means upon movement of the fabric working means so as to progressively release the centering means during the working of the fabric about the base of the beads, and means for simultaneously rotating the drum, bead holding means, bead centering means, and the fabric working means.

The method of my invention includes the steps of assembling a multi-ply band of rubberized cord fabric, forming the band into substantially flat-top toric shape and with the edges of the band extending radially inwardly, laterally holding a bead against each side of the shaped band in the bead area while centering the bead with the shaped band, bending the radially inward edges of the band axially and radially outwardly and around the beads while they are still held against the band, simultaneously and progressively releasing the centering of the beads as the band edges are moved axially and radially outwardly, releasing the lateral hold on the beads, and stitching the extreme edges of the band back against the main body of the band so that the edges of the band encircle the bead.

For a better understanding of my invention reference should be had to the accompanying drawings wherein Fig. 1 is a sectional plan view of one apparatus embodiment of my invention and taken substantially on line I—I of Fig. 2; Fig. 2 is a side elevation of the apparatus shown in Fig. 1; Fig. 3 is a fragmentary enlarged cross sectional view taken substantially on line III—III of Fig. 1; Fig. 4 is a fragmentary enlarged cross sectional view taken substantially on line IV—IV of Fig. 1; Fig. 5 is an enlarged longitudinal cross sectional view through the tire building drum and associated apparatus shown in Figs. 1 and 2 of the drawings; Fig. 6 is a fragmentary cross sectional view taken substantially on line VI—VI of Fig. 5; Fig. 7 is a fragmentary cross sectional view taken substantially on line VII—VII of Fig. 5; Fig. 8 is a diagrammatic longitudinal sectional view illustrating the first step of the practice of the method of my invention; Figs. 9, 10, 11, 12, 13, 14 and 15 are views similar to Fig. 8 and illustrating the successive steps in the practice of my improved method; and Fig. 16 is an enlarged cross sectional view of a typical tire carcass constructed by the methods and apparatus of my invention.

Although the principles of my invention may be applied to the construction of pneumatic tires of substantially any size, weight, or number of plies, they are particularly suited to the building of large, heavy, multi-ply tires of the bus and truck type, and including at least ten plies, most of which are formed into a plurality of bands of two or more plies to facilitate the tire building operation. Accordingly, my invention has been illustrated and will be described in conjunction with the manufacture of large heavy pneumatic tires having at least ten plies, and with the tires being built upon a form, drum or core, of a type having the beads built in the unvulcanized tire in substantially the shape that they will ultimately be in the vulcanized tire.

Now having particular reference to Figs. 1 and 2 of the drawings, the numeral 10 indicates generally a hollow shaft adapted to removably carry at one end a tire building form 12 of any known collapsible type and which has been illustrated as being relatively narrow and of considerable diameter, although, of course, the building form can be of any desired diameter and width for any given tire building operation, for example, of the shape shown by the dotted lines 12a. The shaft 10 is journalled for rotary movement in bearings 14 and 16 supported upon the upper surface of a base 18, which conveniently carries a prime mover, such as an electric motor 20, adapted to rotate the shaft 10 through suitable gearing 22.

Turning now to Figs. 5, 6, and 7 of the drawings the shaft 10 carries at its end adjacent the drum 12 a hub portion 30 adapted to have sliding movement, but non-rotative movement, relative to the end of the shaft. To this end, the shaft 10 is formed with diametrically-opposed, longitudinally-extending slots 32 through which extend a pin 34 having its ends secured in the hub 30 and its center fastened in a block 36 slidably carried inside of the shaft 10. The block 36 is secured to a rod 38 extending axially of the shaft 10. The end of the shaft 38 opposite the block 36 is secured to a block 40 slidably carried inside the shaft 10 and having a pin 42 extending through the block 40 and with its ends directed through the slots 32 and into a grooved collar 44, as best seen in Fig. 1 of the drawings. The position of the grooved collar 44 is controlled by a forked lever 46 rotatably supporting rollers 48 riding in the groove of the collar 44, as best seen in Fig. 3, and with the bifurcated end of the lever 46 preferably being guided for parallel movement with the shaft 10 by suitable means such as guide ways 52 slidably receiving blocks 54 and pivotally secured to the bifurcated ends of the lever 46. The collar 44 may be splined to the shaft 10 by keys 56.

The end of the lever 46 remote from the collar 44 is pivotally secured, as at 60, to a link 62 having a pivotal connection at 64 to a block 66. The position of the lever 46 is controlled by a fluid pressure motor 68 pivotally secured, as at 70, to a block 72 and having a piston rod 74 pivotally secured to the lever at 76. The blocks 66 and 72 are dovetailed to the base 18 of the apparatus so that their longitudinal position can be adjusted in a direction parallel to the shaft 10 to thus control the position of the hub 30 for operations upon tire building drums of different lateral widths. The positioning of the blocks 66 and 72 is achieved by the provision of a screw 80 journalled in a bearing 82 and extending through a tapped opening in the block 72. The blocks 66 and 72 are connected together by a bar 84 so that rotation of the screw 80 by a hand wheel 86 moves the blocks 66 and 72 as a unit on the base 18 of the apparatus in a direction parallel to the shaft 10.

Returning now to Figs. 5, 6, and 7, of the drawings, the hub 30 supports a fabric working means 90. These means may take a plurality of forms, but are conveniently made as a full circular ring of a diameter just slightly less than the internal diameter of the building form 12 so that the fabric working means when moved from the full line position shown in Fig. 5 to the dotted line position will turn the radially inwardly directed edges of a band or ply of fabric B axially outwardly and radially outwardly from the full line position shown in Fig. 5 to the dotted line position shown to initiate the wrapping of the edges of the fabric about an endless, and usually inextensible, bead member M, as hereinafter more fully described. The fabric working means 90 is supported on three or more spokes or by a disk 92 extending from a sleeve 94 carried on the hub 30 for limited movement axially of the hub. A shoulder 96 and a collar 98 limit the movement of the sleeve 94 on the hub 30 and this limited play, while not essential, is often advantageous in permitting an adjustment of the operation of the fabric working means 90.

The end of the shaft 10 near the building form 12 slidably supports a second hub member 100 for axial movement but non-rotary movement relative to the shaft 10. This is achieved by the provision of a pair of diametrically opposed cap screws 102 which extend through the slots 32 in the shaft 10 and into the end of a hollow tube 104 slidably carried on the inside of the shaft 10. The hollow tube 104 is of considerably shorter length than the rod 38 (see Fig. 1) and the tube 104 is adapted to be moved axially of the shaft 10 to control the position of the hub member 100 on the end of the shaft 10. This is achieved in a manner similar to that followed in the control of the rod 38; and, specifically, the end of the tube 104 remote from the hub member 100 is connected by cap screws to a grooved collar 106 and with the cap screws extending through the slots 32 in the shaft 10. A forked lever 108, carrying at one end rollers which ride in the groove of collar 106, is pivotally secured at its other end, as at 110, to the end of a link 112. The link 112 is pivotally secured, as at 114, to a block 116. A fluid pressure motor 118 having its piston rod pivotally connected at 120 to the lever 108 controls the position of the tube 104 and the hub member 100.

The end of the fluid pressure motor 118 remote from the lever 108 is pivotally mounted at 122 on a block 124, and the block 124 and block 116 are adapted to be moved as a unit longitudinally of the base 18 of the apparatus so as to control the initial and operative position of the hub member 100. To this end, a bar 126 secures the blocks 116 and 124 together, and a lug extending from the block 124 is provided with a suitably tapped opening receiving a screw 128 journalled in a bearing 130 on the base 18 of the apparatus. The screw 128 is adapted to be rotated by a hand wheel 132 so as to control the position of the blocks 116 and 124 on the base 18 of the apparatus.

Returning now to Fig. 5, the hub member 100 is adapted to carry any suitable means for holding the bead member M laterally against the side of the tire building form 12, and, more particularly, against the bead area of the fabric band B built onto the building form. The lateral bead holding means usually takes the form of a ring 136 which engages only laterally with the bead M as clearly illustrated in Fig. 5 of the drawings. The ring 136 is secured by spokes 138, for example three in number, to the hub member 100. Thus, by suitably operating the fluid pressure motor 118 the lateral bead holding means 136 may be moved into or out of position.

Associated with the lateral bead holding means 136 are means for radially engaging with the bead and for properly centering the bead with respect to the tire building form. These means take the form of an endless ring 142 which is radially thin and is so shaped as to engage radially under the base of the bead M as best seen in Fig. 5. One or more spokes 144, usually three, secured to the bead centering ring 142 and to a collar 146 carry the bead centering ring 142. The collar 146 is slidably mounted for movement upon an integral cup-shaped extension 148 of the hub member 100 so that the collar 146 may have sliding movement from the full line position shown in Fig. 5 to the dotted line position shown therein. The cup extension 148 of the hub member 100 slidably receives the hub 30.

The bead centering ring 142 is adapted to normally have a relation with the bead holding ring 136 such as is shown in Fig. 5 of the drawings. However, the bead centering ring 142 is adapted to move out axially from under the base of the bead M even though the bead holding ring 136 is not moved. Accordingly, the collar 146 is provided with a plurality of arms 150, for example two, which extend parallel to the axis of the shaft 10 and which are secured at one end to coiled tension springs 152 which have their other ends secured to brackets 154 carried by the bead holding ring 136. Thus, the springs 152 normally resiliently urge the bead centering ring 142 into the full line position shown in Fig. 5 with respect to the bead holding ring 136, but the bead centering ring is adapted to be moved from the full line to the dotted line position upon the yielding of the springs 152.

The construction just described renders it possible to progressively move the bead centering ring 142 out from under the base of the bead as the fabric working means 90 progressively bends the radially innermost side edges of the fabric B around the base of the bead M. This is achieved by the provision of short stud pins 156 at diametrically opposed points in the collar 146 which pins extend through diametrically opposed slots 158 in the cup extension 148, and into notches 160 cut in the end of the hub 30 at diametrically opposed points. Thus, the hub 30 carrying the fabric working means 90 moves to the left in Fig. 5 of the drawings under the action of the fluid motor 68, rod 38, and associated means until the bottom of the notches 160 pick up the pins 156. This causes the collar 146 to be moved in the same direction to tension the springs 152, so that the continued movement of the fabric working means 90 to wrap the edges of the fabric around the base of the bead causes a movement of the bead centering ring 142 progressively out from under the base of the bead to permit the fabric to be moved progressively into place.

The apparatus positioned on the right hand side of the building form 12 in Figs. 1, 2, and 5 and adapted to handle the positioning of the other bead and the wrapping around the bead of the other fabric edge is substantially the same as that already described. Specifically, the apparatus includes a bed 170 which slidably supports a carriage 172 for movement to and from the right hand side of the building form 12. This is achieved by a screw 174 driven by suitable prime mover means (not shown), and with the screw being extended through a suitably tapped block 176 secured to the base of the carriage 172. Suitable supporting rollers 178 for the carriage may be provided together with hold-down rollers 180. A screw 182 secured to the bed 170 may be provided to function as an adjustable stop limiting the movement of the carriage 172 towards the building form 12. The carriage 172 carries a hollow shaft 184 in bearing clamps 186. Preferably the shaft 184 is non-rotatively mounted on the carriage 172, as in the embodiment of my invention illustrated, but it should be understood that I may journal the shaft 184 on the carriage 172 if desired. Fabric working means 90a mounted on the shaft 184 may take substantially the form of the fabric working means 90 heretofore described. The axial position of the fabric working means 90a on the shaft 184 is controlled by means quite similar to those controlling the position of the fabric working means 90. Specifically, the hollow shaft 184 is provided with diametrically opposed slots 188, and a block 190 slidably journalled within the hollow shaft 184 carries a pin 192 which extends through the slots 188 into a hub member 194. A lost motion sleeve 196 rotatably mounted on the hub member 194 may be provided to support the fabric working means 90a in a manner similar to the sleeve 94. The block 190 is secured to a rod 197 which extends axially of the hollow shaft 184, and which acts as the extension of a piston rod of a fluid pressure motor 198 mounted at the end of the shaft 184.

Associated with the fabric working means 90a is a bead holding ring 136a and a bead centering ring 142a. The position of the bead holding ring 136a is controlled by a fluid pressure motor 200 pivotally secured, as at 202, to the carriage 172 and having its piston rod pivotally secured at 204 to a forked lever 206 pivotally secured at 208 to a frame 210 mounted on the upper portion of the carriage 172. The forked lever 206 has rollers 212 engaging in a grooved collar 214 formed integral with or secured to a hub member 216 to which the bead holding ring 136a is secured by suitable spokes 218. The bead centering ring 142a is adapted to have limited resilient movement with the bead holding ring 136a in the manner already described in conjunction with the bead holding ring 136 and the bead centering ring 142, and the operation of the fabric working means 90a in picking up the bead centering ring 142a and progressively moving the bead centering ring away from under the base of the bead and simultaneously folding the edge of the fabric around the base of the bead is exactly the same on the right hand side of the apparatus as it is on the left hand side of the apparatus and already described.

Turning now to Figs. 8 to 15 of the drawings, and better illustrating the practice of the method of my invention, as well as further illustrating the structure and operation of the apparatus, Fig. 8 shows the application of the first band B of fabric to the tire building form. The band B may be a single ply of rubberized cord fabric, but is usually in the form of a multi-ply band, for example four plies of fabric laid at alternate angles, and usually constructed upon a separate band building apparatus and then brought to the tire building form 12 and positioned thereover, and with the shaft 184, and carriage 172 being retracted out of the way by the operation of the screw 174 so that one side of the tire building form 12 is free to position the band B thereover.

However, prior to the application of the band B to the tire building form 12, and with the form 12 either collapsed or removed from the end of the shaft 10 a pair of tire beads M and M' are positioned in the manner shown in Fig. 8. Particularly, the tire bead M' is generally supported upon a suitable hook 230 associated with the bearing 14 of the apparatus, and the circular tire bead M' is moved into this position over the bead holding ring 136 by squeezing the bead M' to make it oval so that it can be passed first over one half of the holding ring 136 and then over the other half of the ring and onto its position on the hook 230. The bead M is, of course, positioned against the side of the bead holding ring 136 with the base of the bead M resting on the bead centering ring 142. A tire bead N is mounted on the bead centering ring 142a and against the side of the bead holding ring 136a.

Now the band B of rubberized fabric is mounted on the building form 12 in the position shown in Fig. 8 of the drawings, and thereafter the fabric working means 90 and 90a are moved into the dotted position shown in Fig. 8 from the full line position shown by the actuation of the fluid pressure motors 68 and 198, with the screw 174 being operated to move the carriage 172 and the shaft 184 from the full line position shown in Fig. 8 to the dotted line position. Now, the band B is stitched down upon the building form 12 with or without the application of rubber cement to the bead areas of the form. This stitching operation may be achieved by any usual or known type of stitching means indicated generally by the numerals 232 and 234.

Figure 9:
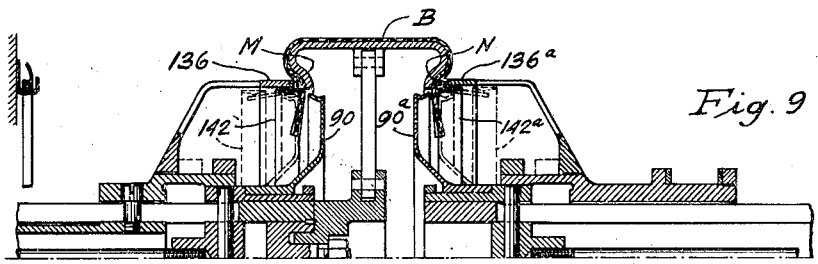

Next the beads M and N are moved in against the sides of the stitched down band B in the manner illustrated in Fig. 9 of the drawings, and by the actuation of the fluid pressure motors 118 and 200. With the beads M and N held tightly against the sides of the fabric by the lateral bead holding rings 136 and 136a and properly centered by the centering rings 142 and 142a the fabric working means 90 and 90a are moved axially outwardly of the drum of the building form 12, and against the radially inwardly directed edges of the band B. The axially outward movement of the fabric working means 90 and 90a is achieved by the reversal of the flow of fluid pressure to the fluid pressure motors 68 and 198, and this movement causes substantially a full circle engagement of the fabric moving means against the edges of the fabric and the movement of the fabric edges from the full line position shown in Fig. 9 to the dotted line position shown therein.

Of course, the outward movement of the fabric moving means 90 and 90a is accompanied by a progressive movement of the bead centering rings 142 and 142a from under the bases of the beads M and N, all as above described. After the fabric edges have been folded in smooth and firm relation about the base of the beads and are extending substantially parallel to the axis of the building form 12 automatic limit switches or manually controlled means can be operated to move the bead holding rings 136 and 136a out of the way and to the position shown in Fig. 10, and this is achieved of course by a reversal of fluid flow to the fluid pressure motors 118 and 200.

Figure 10:
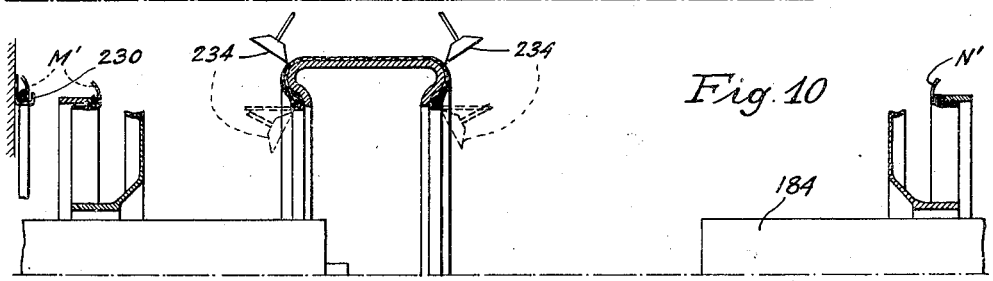

Now the same stitching means 234, or other stitching means may be used to move the edges of the band B up and around the beads M and N from the dotted line position shown in Fig. 10 to the full line position so that the edges of the fabric fully surround and grip the beads M and N.

Figure 11:
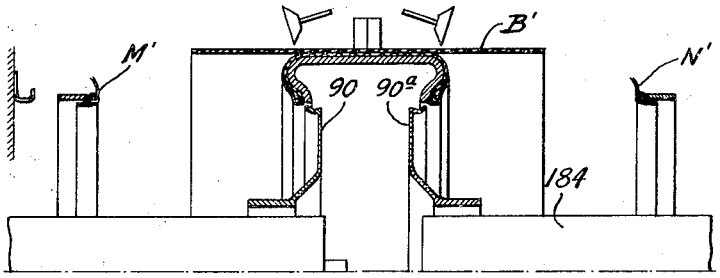
Figure 12:
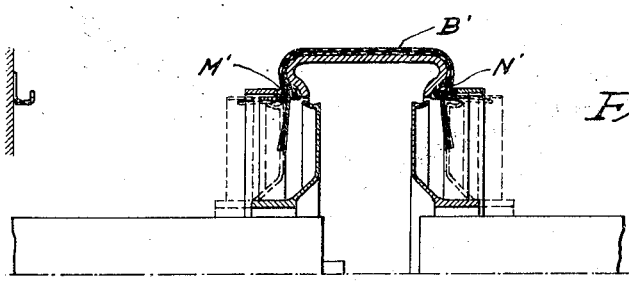

With the shaft 184 in the retarded position a second bead N' is slipped onto the bead holding and centering means of shaft 184 and a second band B' of fabric is moved over the building form, and, thereafter, the shaft 184 is moved back into the position shown in Fig. 11 and the fabric working means 90 and 90a are moved to the position shown in Fig. 11. The bead M' is then taken from the hook 230 and is moved over and positioned on the bead holding and centering means, so that after the bead B' has been stitched down into the position shown in Fig. 12 the beads M' and N' can be moved in against the side of the band B', as seen in Fig. 12.

The edges of the band B' will then be moved around the beads M' and N' in the manner previously described, and as particularly shown in Fig. 13. Thereafter, one or more additional bands or plies may be applied to the tire, for example, Fig. 14 illustrates the application of a two ply and breaker assembly band to the outer periphery of the tire carcass, and this band is stitched down in known fashion onto the tire carcass but since the edges of the ply terminate substantially at the inner toes of the beads the use of the fabric working means 90 and 90a is not required. Thereafter, the tread and side wall portion T of the tire carcass is assembled in position on the carcass and stitched down in known manner in conjunction with one or more suitable chafing strips.

The finished tire carcass is illustrated in Fig. 16 of the drawings.

From the foregoing it will be recognized that the objects of my invention have been achieved by the provision of improved methods and apparatus for facilitating the construction of a pneumatic tire, and, particularly, large and heavy pneumatic tires having a relatively large number of plies, for example, ten or more. The handling and working of very heavy stiff rubberized fabric edges of multi-ply bands used in the construction of pneumatic tires of the indicated type is speeded up and simplified and objectionable wrinkles, buckles, and fabric dislocations are avoided and overcome. The apparatus is easily operated by the ordinary tire builder with a minimum of instruction and operates to rapidly and efficiently produce large pneumatic tire casings. The method of operation is less expensive and better than any known tire building method with which I am familiar.

While in accordance with the patent statutes I have specifically illustrated and described my advance in the art, it should be particularly understood that I am not to be limited thereto or thereby, but that the scope of my invention is defined in the appended claims.

I claim:

1. Apparatus for building pneumatic tires and comprising a rotary building form, means rotatable with the form for laterally holding a bead against one side of the form, radial bead engaging means rotatable with the form for centering the bead on one side of the form, fabric working means rotatable with the form and during at least a portion of the operation being positioned inside of the form and adapted to engage throughout a full circle with the edges of rubberized fabric material extending radially inwardly of the form, means for moving the fabric working means substantially axially outwardly of the form to bend the inwardly extending fabric edges around the base of the bead, means associated with the fabric working means for picking up the centering means upon movement of the fabric working means so as to progressively release the centering means during the working of the fabric about the base of the bead, and means for simultaneously rotating the drum, the bead holding means, the bead centering means, and the fabric working means.

2. Apparatus for building pneumatic tires and comprising a hollow shaft, a building form mounted on the shaft, a hub slidably mounted on the shaft adjacent the form, a ring mounted on the hub and adapted to laterally hold a bead against the form, bead centering means slidably associated with the ring, resiliently yieldable means normally holding the ring and centering means together, a block slidably received within the shaft and connected through longitudinal slots in the shaft to the hub, and means for moving the block in the shaft.

3. Apparatus for building pneumatic tires and comprising a hollow shaft, a building form mounted on the shaft, a hub slidably mounted on the shaft adjacent the form, a ring mounted on the hub and adapted to laterally hold a bead against the form, rod means slidably received within the shaft and connected through longitudinal slots in the shaft to the hub, and means for moving the rod means longitudinally of the shaft.

4. Apparatus for building pneumatic tires and including a rotary building form, means on each side of the form for laterally holding a bead against each side of the form, radial bead engaging means on each side of the form for centering a bead on each side of the form, means mounting each radial bead engaging means for movement relative to the associated lateral bead holding means on the same side of the form, means resiliently connecting each radial bead engaging means with the associated lateral bead holding means, and means for rotating the form, and at least one radial bead engaging means and at least one lateral bead holding means.

5. Apparatus for building pneumatic tires and including a rotary building form, means on each side of the form for laterally holding a bead against each side of the form, radial bead engaging means on each side of the form for centering a bead on each side of the form, means mounting each radial bead engaging means for movement relative to the associated lateral bead holding means on the same side of the form, means resiliently connecting each radial bead engaging means with the associated lateral bead holding means, means for progressively folding a skirt of fabric over the base of a bead, and means for progressively moving the radial bead engaging means out from under the base of the bead as the fabric is folded into place thereon.

6. Pneumatic tire building apparatus including a building form, a hollow shaft carrying the form, a hub slidably mounted on the shaft adjacent the form, a fabric working means carried by the hub and adapted to be received within the form, means extending through the shaft and connected to the hub through slots in the shaft, means for moving the last-named means to control the position of the hub and fabric means relative to the form, a second hub on the shaft, bead holding means on the second hub, means operative through the shaft to move the said second hub and bead holding means relative to the form, a second shaft, carriage means supporting the second shaft in alignment with the first and adapted to move the second shaft to and from a position at one side of the form, fabric working means adjustably carried on the second shaft, and bead holding means adjustably carried by the second shaft.

7. Pneumatic tire building apparatus including a building form, a hollow shaft carrying the form, a hub slidably mounted on the shaft adjacent the form, a fabric working means carried by the hub and adapted to be received within the form, means extending through the shaft and connected to the hub through slots in the shaft, means for moving the last-named means to control the position of the hub and fabric means relative to the form, a second hub on the shaft, bead holding means on the second hub, and means operative through the shaft to move the said second hub and bead holding means relative to the form.

8. Pneumatic tire building apparatus including a building form, a hollow shaft carrying the form, a hub slidably mounted on the shaft adjacent the form, a fabric working means carried by the hub and adapted to be received within the form, means extending through the shaft and connected to the hub through slots in the shaft, and means for moving the last-named means to control the position of the hub and fabric means relative to the form.

9. Pneumatic tire building apparatus including a building form, a hollow shaft carrying the form, a hub slidably mounted on the shaft adjacent the form, a fabric working means carried by the hub and adapted to be received within the form, means extending through the shaft and connected to the hub through slots in the shaft, means for moving the last-named means to control the position of the hub and fabric means relative to the form, a second shaft, carriage means supporting the second shaft in alignment with the first and adapted to move the second shaft to and from a position at one side of the form, and fabric working means adjustably carried on the second shaft.

JORGEN I. HAASE.

REFERENCES CITED

The following references are of record in the file of this patent:

UNITED STATES PATENTS

| Number | Name | Date |
|---|---|---|
| 1,748,263 | Wikle | Feb. 25, 1930 |
| 1,966,541 | Denmire | July 17, 1934 |
| 2,009,599 | Woock | July 30, 1935 |
| 2,121,252 | Marco | June 21, 1938 |
| 2,208,324 | Haase | July 16, 1940 |
| 2,313,035 | Breth | Mar. 9, 1943 |
| 2,409,974 | Breth et al. | Oct. 22, 1946 |